United States Patent
Masin et al.

(10) Patent No.: US 11,308,410 B2
(45) Date of Patent: Apr. 19, 2022

(54) CONTROL SYSTEM WITH OPTIMIZED PERIODIC ADJUSTMENTS OF SYSTEM CONTROL SETTINGS USING MARS-BASED MILP OPTIMIZATION

(71) Applicant: International Business Machines Corporation, Armonk, NY (US)

(72) Inventors: Michael Masin, Haifa (IL); Eliezer Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 16/199,259

(22) Filed: Nov. 26, 2018

(65) Prior Publication Data
US 2020/0167678 A1    May 28, 2020

(51) Int. Cl.
*G06N 7/00* (2006.01)
*G06F 17/11* (2006.01)
*G06Q 10/04* (2012.01)

(52) U.S. Cl.
CPC ............... *G06N 7/00* (2013.01); *G06F 17/11* (2013.01); *G06Q 10/04* (2013.01)

(58) Field of Classification Search
CPC . G06N 7/00; G06N 7/08; G06N 5/003; G06F 17/11; G06Q 10/04
(Continued)

(56) References Cited

U.S. PATENT DOCUMENTS 9,418,046 B2   8/2016  Lustig
9,811,061 B1   11/2017 Hu et al.
(Continued)

FOREIGN PATENT DOCUMENTS

CN    106875056    6/2017

OTHER PUBLICATIONS

Nadia Martinez et al., "Global optimization of non-convex piecewise linear regression splines", 2017, Journal of Global Optimization 68.3, pp. 563-586.*

(Continued)

*Primary Examiner* — Juan C Ochoa
(74) *Attorney, Agent, or Firm* — Dvir Gassner

(57) ABSTRACT

Constructing a MARS prediction model using predictor variables at a first point in time within a time horizon, including directly-controllable variables of first physical characteristics of a system and that are associated with adjustable operational control settings for directly controlling the first physical characteristic, and including controllable variables of second physical characteristics that are affected by the first physical characteristics, recursively using the prediction model to define an optimization problem for later point in time within the time horizon, transforming the optimization problem into a MILP problem, and solving the MILP problem using an optimization engine to determine, for any given one of the directly-controllable variables and corresponding to at least one of the points in time, for adjusting, using the optimized value, the adjustable operational control setting corresponding to the given directly-controllable variable and thereby control the physical characteristic associated with the directly-controllable variable.

12 Claims, 5 Drawing Sheets

(58) Field of Classification Search
USPC .......................................................... 703/2
See application file for complete search history.

(56) References Cited

U.S. PATENT DOCUMENTS

| | | | |
|---|---|---|---|
| 2011/0066258 A1* | 3/2011 | Torzhkov | G05B 13/042 |
| | | | 700/29 |
| 2016/0217380 A1 | 7/2016 | Yedidia et al. | |
| 2018/0217568 A1* | 8/2018 | Parvania | G06Q 10/06312 |
| 2018/0224814 A1* | 8/2018 | Elbsat | F24F 11/30 |

OTHER PUBLICATIONS

Nadia Maria Martinez Cepeda, "Global optimization of non-convex piecewise linear regression splines", 2013, dissertation, 92 pages.*

Ukesh Chawal, Optimizing a System of Electric Vehicle Charging Stations, May 2018, Dissertation, 91 pages.*

Zirun Zhang, "High-Dimensional Adaptive Dynamic Programming with Mixed Integer Linear Programming", 2015, Dissertation, 117 pages.*

Jerome H. Friedman, "Multivariate Adaptive Regression Splines", The Annals of Statistics, 1991, vol. 19, No. 1, pp. 1-67.

Alexander Zadorojniy et al., "Operational optimization of wastewater treatment plants: A CMDP based decomposition approach", Annals of Operations Research, 2016.

Scott Crino et al., "Global Optimization With Multivariate Adaptive Regression Splines", IEEE Transactions on Systems, Man, and Cybernetics, Part B (Cybernetics), Apr. 2007, vol. 37, Issue 2, pp. 333-340.

Gerhard-Wilhelm Webwer et al., "CMARS: A new contribution to nonparametric regression with multivariate adaptive regression splines supported by continuous optimization", Inverse Problems in Science and Engineering, 2012, vol. 20, Issue 3, pp. 371-400.

* cited by examiner

CONTROL SYSTEM WITH OPTIMIZED PERIODIC ADJUSTMENTS OF SYSTEM CONTROL SETTINGS USING MARS-BASED MILP OPTIMIZATION

BACKGROUND

The invention relates to the field of industrial control systems.

A mixed-integer linear program (MILP) is a problem representing the minimization or maximization of a linear function subject to linear constraints, where a designated set of decision variables are required to take on integer values. These problems are typically represented using a matrix structure, where constraints correspond to rows and columns correspond to decision variables. The optimal solution is a set of values of the decision variables that gives the optimum objective value, which is the minimum or maximum value of the linear function subject to the constraints.

One application for MILP is for optimal control of industrial systems. A typical solver would require all the possible resource/subsystem combinations to be given to the solver, with each combination corresponding to a decision variable. However, equations that describe the system can be nonlinear, and linearization is a non-trivial task. Furthermore, the problem becomes intractable when the number of combinations is large. Even where a problem is tractable, a MILP solver may take a very long time to determine a solution, depending on the complexity of the linear constraints.

SUMMARY

In one aspect of the invention a system control method is provided, the method including constructing a multivariate adaptive regression splines prediction model using a plurality of predictor variables at a future point in time that is after a first time interval, where one or more of the predictor variables is a directly-controllable variable associated with a physical characteristic of a system having a plurality of physical characteristics, where the directly-controllable variable is associated with an adjustable operational control setting for directly controlling the directly-controllable-variable-associated physical characteristic, and where one or more of the predictor variables is a controllable variable associated with any of said physical characteristics that is affected by any of said physical characteristics associated with any directly-controllable variable, recursively using the prediction model to define an optimization problem for at least one additional future point in time that is after a corresponding additional time interval, transforming the optimization problem into a mixed integer linear programming problem, and solving the mixed integer linear programming problem using an optimization engine to determine at least one optimized value, for any given one of the directly-controllable variables and corresponding to at least one of the points in time, for adjusting, using the optimized value, the adjustable operational control setting corresponding to the given directly-controllable variable and thereby control the physical characteristic associated with the directly-controllable variable.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
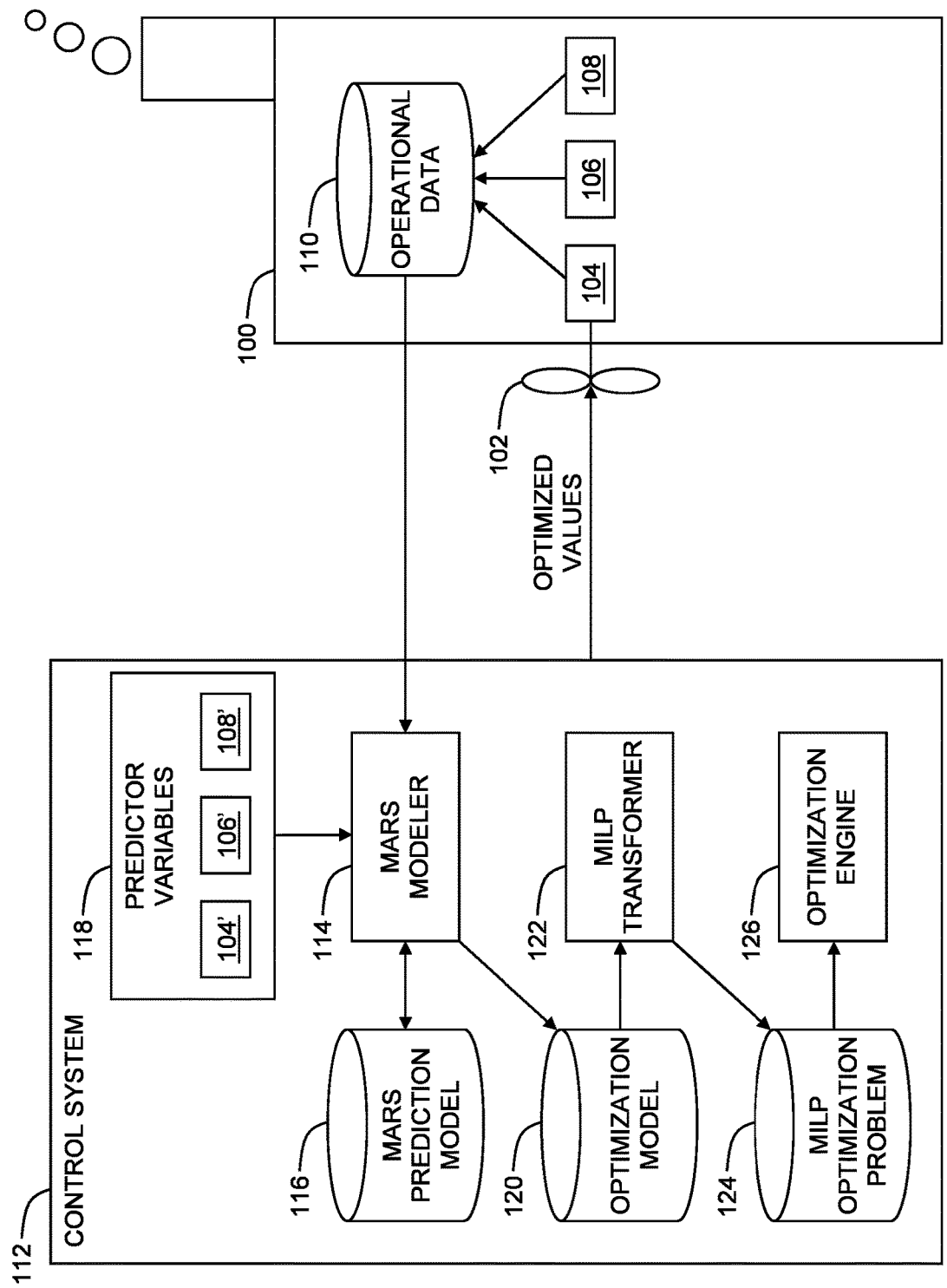
FIG. 1 is a simplified conceptual illustration of a system for control system with optimized periodic adjustments of system control settings, constructed and operative in accordance with an embodiment of the invention.

Reference is now made to FIG. 1, which is a simplified conceptual illustration of a control system with optimized periodic adjustments of system control settings, constructed and operative in accordance with an embodiment of the invention. In the system of FIG. 1, a system 100, such as a wastewater treatment plant, includes any number of adjustable control elements 102 having adjustable operational control settings for directly adjusting various directly-controllable physical characteristics 104 of system 100, such as levels of dissolved oxygen in treated wastewater. System 100 also typically includes any number of controllable physical characteristics 106, such as effluent total nitrogen concentration, that are affected by changes in directly-controllable physical characteristics 104. System 100 may also include any number of uncontrollable physical characteristics 108, such as influent volume, that are not affected by changes in directly-controllable physical characteristics 104 and controllable physical characteristics 106. Operational data 110, such as of real historical measurements of, and/or simulations of, values of physical characteristics 104, 106, and 108, are provided in accordance with conventional techniques.

A control system 112 is provided for controlling system 100. Control system 112 preferably includes a multivariate adaptive regression splines (MARS) modeler 114 configured in accordance with conventional techniques to construct a MARS prediction model 116 using any number of predictor variables 118 at one or more predefined future control points in time over a predefined time horizon, such as two weeks, where each of the predefined future control points in time is after a different predefined time interval, such as every two hours, within the predefined time horizon. Each of the predictor variables 118 is one of the following types:

a) a directly-controllable variable 104' associated with any of directly-controllable physical characteristics 104, where the directly-controllable variable 104' is associated with an adjustable operational control setting for directly controlling its associated directly-controllable-physical characteristic 104;

b) a controllable variable 106' associated with any of controllable physical characteristics 106;

c) an uncontrollable variable 108' associated with any of uncontrollable physical characteristics 108.

MARS modeler 114 is configured to construct MARS prediction model 116 using operational data 110, where the values of predictor variables 118 are taken from corresponding values of physical characteristics 104, 106, and 108 in operational data 110. In one embodiment, MARS modeler 114 initially fits MARS prediction model 116 to the first control point in time after the first time interval within the time horizon. Thereafter, MARS modeler 114 recursively uses MARS prediction model 116 is to define an optimization problem 120 over the entire time horizon by modelling each subsequent future control point in time after its corresponding time interval within the time horizon.

Control system 112 preferably includes a mixed integer linear programming (MILP) transformer 122 configured to transform optimization problem 120 into a MILP optimization problem 124 in accordance with conventional techniques.

Control system 112 preferably includes an optimization engine 126 configured to solve MILP optimization problem 124 in accordance with conventional techniques to determine an optimized value for any, and preferably each, predictor variable 118 that is a directly-controllable variable 104', and for any, and preferably each, of the control points in time within the time horizon. The optimized value for a given directly-controllable variable 104' corresponding to a given control point in time within the time horizon is then preferably used by control system 112 at the given control point in time to adjust the operational control setting of an adjustable control element 102 that controls the physical characteristic 104 associated with the given directly-controllable variable 104', and thereby control the physical characteristic 104 of system 100. This is preferably repeated for any, and preferably each, optimized value at any, and preferably each, control point in time within the time horizon.

Operation of control system 112 may be further understood as follows. Assume that a number of discretized time intervals T within the time horizon is equal to T≥1. For example, if time horizon spans two weeks ahead, and directly-controllable physical characteristics 104 are scheduled for adjustment at two-hour intervals, then T=12*14=168.

Let $N_P = N_D + N_C + N_U$ denote the number of predictor variables 118, where $N_D$ represents one or more directly-controllable variables 104', $N_C$ represents one or more controllable variables 106', and $N_U$ represents zero or more uncontrollable variables 108'. MARS prediction model 116 is constructed for the first time interval and fitted using values of physical characteristics 104, 106, and 108 in operational data 110 for corresponding directly-controllable variables 104', controllable variables 106', and uncontrollable variables 108'. The values of the three types of variables over the time horizon are:

$$X_{it}^D, 1 \le i \le N_D, 0 \le t \le T-1$$

$$X_{it}^U, 1 \le i \le N_U, 0 \le t \le T-1$$

$$Y_{it}^C, 1 \le i \le N_C, 0 \le t \le T-1$$

and the MARS estimation function is:

$$Y_{i,t+1}^C = C_{0i}^f + \Sigma_{k=1}^{N_i^f} C_{ik}^f f_{ik}(X_{1t}^D, \ldots, X_{N_D,t}^D, X_{1t}^U, \ldots, X_{N_U,t}^U, Y_{1t}^C, \ldots, Y_{N_C,t}^C), 1 \le i \le N_C, 0 \le t \le T-1$$ (Eq. 1)

In Eq. 1 above, $C_{ik}^f$ are constants, $f_{ik}$ are hinge functions, and $N_i^f$ is the number of MARS hinge functions, for which the following piecewise-linear hinge functions are used:

$$f_{ik} = (X_{it}^D - u_{ik})^+ \text{ or } f_{ik} = (u_{ik} - X_{it}^D)^+, 1 \le i \le N_D, 1 \le k \le N_i^f$$

$$f_{ik} = (X_{it}^U - u_{ik})^+ \text{ or } f_{ik} = (u_{ik} - X_{it}^U)^+, 1 \le i \le N_U, 1 \le k \le N_i^f$$

$$f_{ik} = (Y_{it}^C - u_{ik})^+ \text{ or } f_{ik} = (u_{ik} - Y_{it}^C)^+, 1 \le i \le N_C, 1 \le k \le N_i^f$$

where $u_{ik}$ are constants representing MARS knots.

MARS prediction model 116 is recursively used to define optimization problem 120 for the entire time horizon. The cost function for time period [0,T] may be represented as:

$$\Sigma_{i=1}^{N_D} \Sigma_{t=0}^{T} C_{it}^D X_{it}^D + \Sigma_{i=1}^{N_C} \Sigma_{t=0}^{T} C_{it}^C Y_{it}^C,$$ (Eq. 2)

where $C_{it}^D$, $1 \le i \le N_D$ and $C_{it}^C$ $1 \le i \le N_C$ are corresponding cost coefficients. These cost coefficients can be equal to zero or time-discounted. The first term of Eq. 2 is linear over directly-controllable variables 104'. The second term of Eq. 2 is linear over controllable variables 106'. Using recursive application of the fitted model given by Eq. 1 over the time horizon and estimates of uncontrollable variables 108', the second term of Eq. 2 can be represented as the piecewise linear function over directly-controllable variables 104', e.g., $X_{it}^D$, $1 \le i \le N_D$, $0 \le t \le T-1$.

Constraints may be represented as:

$$\Sigma_{i=1}^{N_D} \Sigma_{t=0}^{T} R_{jit}^D X_{it}^D + \Sigma_{i=1}^{N_U} \Sigma_{t=0}^{T} R_{jit}^U X_{it}^U + \Sigma_{i=1}^{N_C} \Sigma_{t=0}^{T} R_{jit}^C Y_{it}^C \le V_j, 1 \le j \le M,$$ (Eq. 3)

where M is the number of constraint equations, $R_{jit}^D, R_{jit}^U$, $R_{jit}^C$ are constraint coefficients, and $V_j$ are constants. The first term of Eq. 3 is linear over directly-controllable variables 104'. The second term of Eq. 3 is a constant, given estimates of uncontrollable variables 108'. The third term of Eq. 3 can be represented as the piecewise linear function over directly-controllable variables 104' similar to the second term of Eq. 2.

Optimization problem 120 may be expressed as:

$$\sum_{i=1}^{N_D} \sum_{t=0}^{T} C_{it}^D X_{it}^D + \sum_{i=1}^{N_C} \sum_{t=0}^{T} C_{it}^C Y_{it}^C \to \min$$

given $$\sum_{i=1}^{N_D} \sum_{t=0}^{T} R_{jit}^D X_{it}^D + \sum_{i=1}^{N_U} \sum_{t=0}^{T} R_{jit}^U X_{it}^U + \sum_{i=1}^{N_C} \sum_{t=0}^{T} R_{jit}^C Y_{it}^C \le V_j, 1 \le j \le M.$$

where both constraints and the cost function are piecewise-linear over directly-controllable variables 104'.

Optimization problem 120 is transformed into MILP optimization problem 124, which is then solved by optimization engine 126 to provide optimal values for directly-controllable variables 104' over the time horizon.

In one embodiment, MILP optimization problem 124 is solved only at the beginning of the time horizon. In another embodiment, MILP optimization problem 124 is solved at the beginning of the time horizon, and also during the time horizon at one or more predetermined solution points in time, such as every 24 hours or just prior to the actual start of each subsequent time interval within the time horizon, where each solution covers the remaining time horizon. In another embodiment, a moving time horizon of a constant size (e.g., always two weeks ahead of the solution time) is used, where MILP optimization problem 124 is solved at predetermined intervals at which the beginning of the moving time horizon is set. Any optimized value from any solution of MILP optimization problem 124, where the optimized value corresponds to a given time horizon, control point in time, and directly-controllable variable 104' is used by control system 112 as described above to control the corresponding physical characteristic 104 of system 100.

Figure 2A:
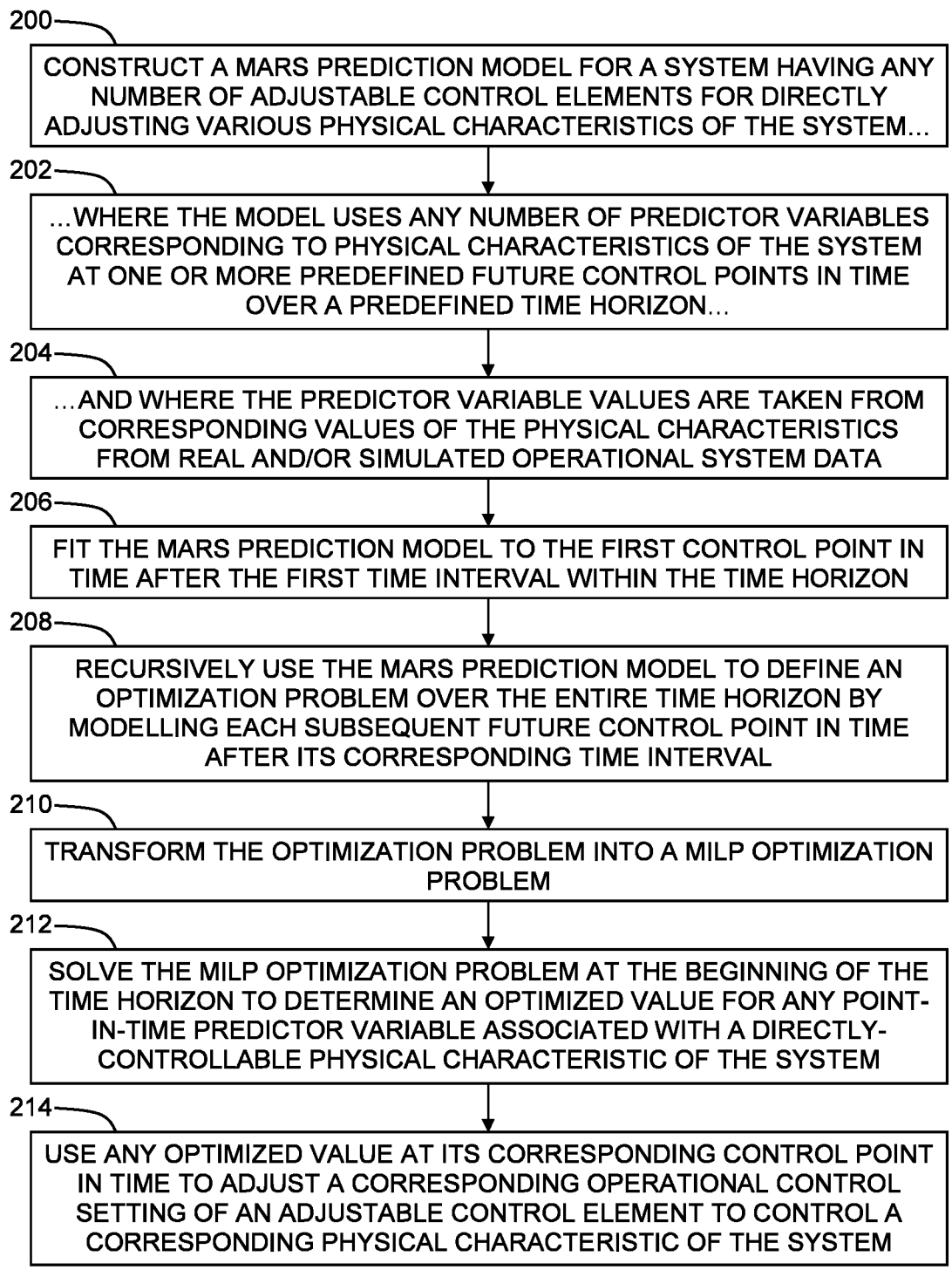
FIGS. 2A, 2B, and 2C are simplified flowchart illustrations of exemplary methods of operation of the system of FIG. 1, operative in accordance with various embodiments of the invention.

Reference is now made to FIG. 2A, which is a simplified flowchart illustration of an exemplary method of operation of the system of FIG. 1, operative in accordance with an embodiment of the invention. In the method of FIG. 2A, a MARS prediction model is constructed for a system having any number of adjustable control elements for directly adjusting various physical characteristics of the system (step 200), where the model uses any number of predictor variables corresponding to physical characteristics of the system at one or more predefined future control points in time over a predefined time horizon (step 202), and where the values of the predictor variables are taken from corresponding values of the physical characteristics from real and/or simulated operational data of the system (step 204). The MARS prediction model is fit to the first control point in time after the first time interval within the time horizon (step 206). The MARS prediction model is recursively used to define an optimization problem over the entire time horizon by modelling each subsequent future control point in time after its corresponding time interval within the time horizon (step 208). The optimization problem is transformed into a MILP optimization problem (step 210). The MILP optimization problem is solved at the beginning of the time horizon to determine an optimized value for any predictor variable associated with a directly-controllable physical characteristic of the system, and corresponding to any control point in time during the time horizon (step 212). Any optimized value is used at its corresponding control point in time to adjust a corresponding operational control setting of an adjustable control element to control a corresponding physical characteristic of the system (step 214).

Figure 2B:
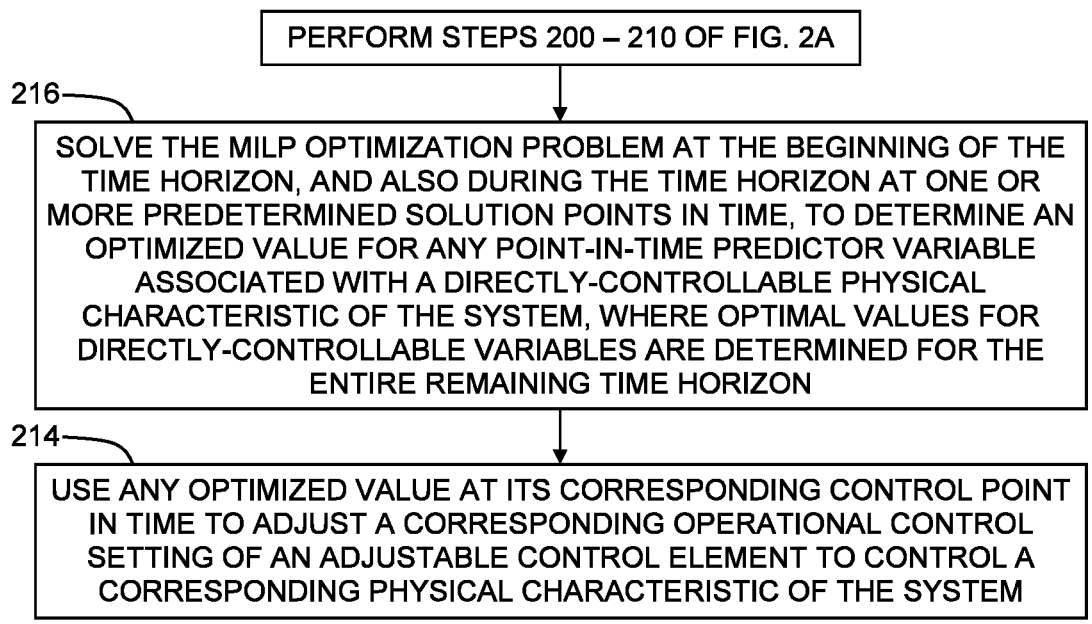

Reference is now made to FIG. 2B, which is a simplified flowchart illustration of an exemplary method of operation of the system of FIG. 1, operative in accordance with an embodiment of the invention. The method of FIG. 2B is substantially similar to the method of FIG. 2A, with the notable exception that the MILP optimization problem is solved at the beginning of the time horizon, and also during the time horizon at one or more predetermined solution points in time, where optimal values for directly-controllable variables 104' are determined for the entire remaining time horizon (step 216).

Figure 2C:
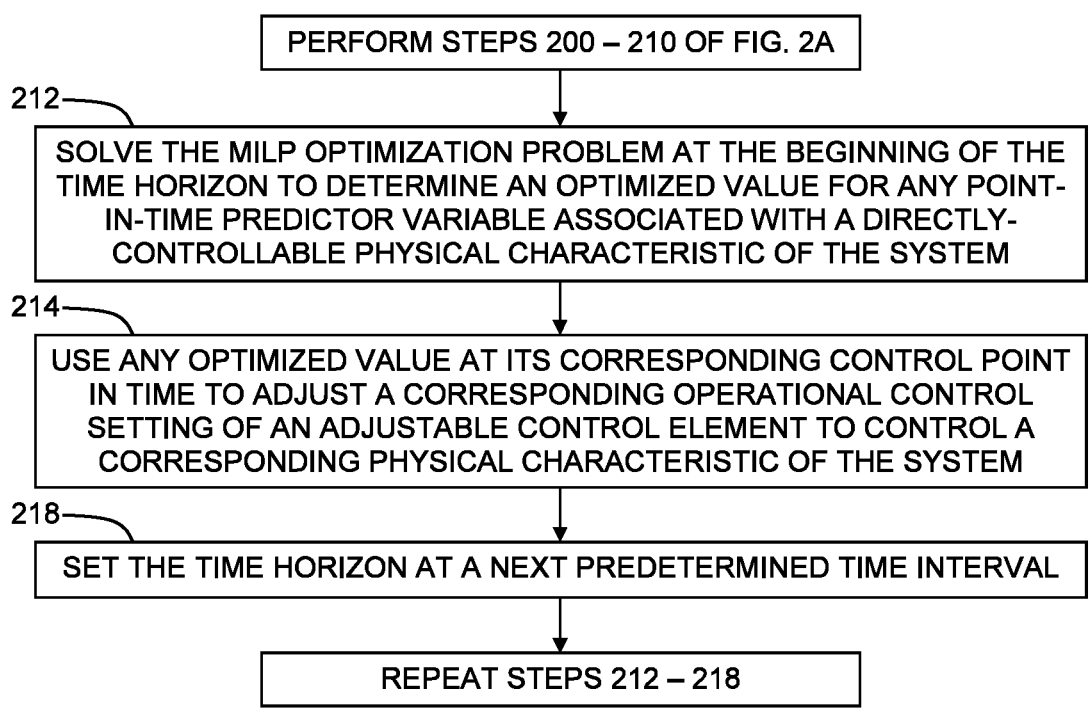

Reference is now made to FIG. 2C, which is a simplified flowchart illustration of an exemplary method of operation of the system of FIG. 1, operative in accordance with an embodiment of the invention. The method of FIG. 2B is substantially similar to the method of FIG. 2A, with the notable exception that a moving time horizon of a constant size is used, where the MILP optimization problem is solved at predetermined intervals at which the beginning of the moving time horizon is set (step 218). Steps 212-218 are then repeated at each such time interval.

Figure 3:
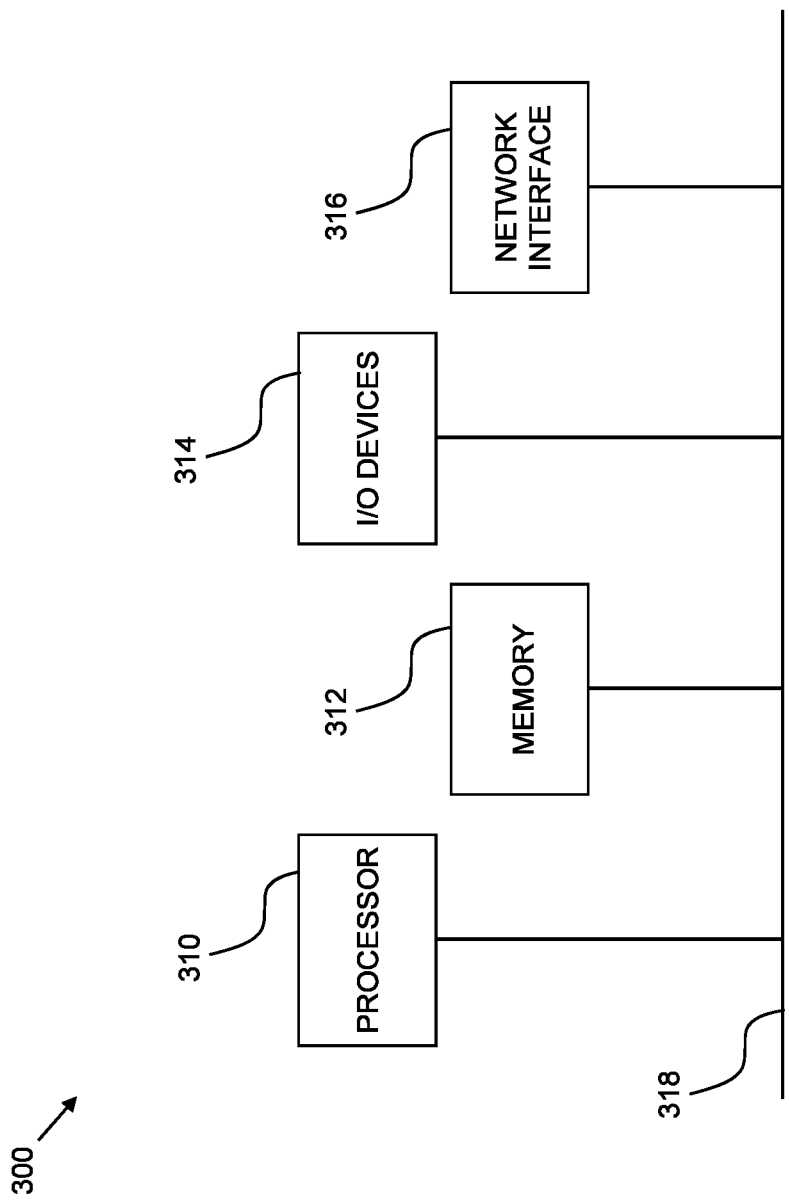
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling a physical system, wherein the physical system comprises:
    adjustable operational control settings, and
    a plurality of physical characteristics each associated with a predictor variable,
    wherein at least one of the predictor variables is a directly-controllable variable associated with one of the operational control settings and directly controls one of the plurality of physical characteristics that is associated with the respective directly-controllable variable,
    wherein at least one of the predictor variables is a controllable variable associated with any of the plurality of physical characteristics that is affected by any of the plurality of physical characteristics associated with any directly-controllable variable,
the method comprising, during a predefined time horizon that includes multiple time intervals each followed by a control point:
    at each of the control points:
    (a) constructing a multivariate adaptive regression splines (MARS) prediction model using those of the predictor variables associated with the time interval that immediately precedes the respective control point;
    (b) using the MARS prediction model to define an optimization problem for the respective control point;
    (c) transforming the optimization problem into a mixed integer linear programming (MILP) problem;
    (d) solving the MILP problem using an optimization engine, to determine at least one optimized value for any given one of the directly-controllable variables; and
    (e) adjusting, using the at least one optimized value, the adjustable operational control setting corresponding to the given directly-controllable variable, to thereby control the physical characteristic associated with the directly-controllable variable during the time interval immediately following the respective control point.

2. The method according to claim 1 wherein the constructing comprises constructing the MARS prediction model using, as values for any of the predictor variables, real historical measurements of values of any of the plurality of physical characteristics of the physical system.

3. The method according to claim 1 wherein the constructing comprises constructing the MARS prediction model using, as values for any of the predictor variables, simulated historical measurement values of any of the plurality of physical characteristics of the physical system.

4. The method according to claim 1 wherein one or more of the predictor variables is an uncontrollable variable associated with any of the plurality of physical characteristics that is unaffected by any of the plurality of physical characteristics that are associated with any directly-controllable variable.

5. The method according to claim 1 wherein the predefined time horizon is a moving time horizon of a constant size.

6. A control system for controlling a physical system, wherein the physical system comprises:
   adjustable operational control settings, and
   a plurality of physical characteristics each associated with a predictor variable,
   wherein at least one of the predictor variables is a directly-controllable variable associated with one of the operational control settings and directly controls one of the plurality of physical characteristics that is associated with the respective directly-controllable variable,
   wherein at least one of the predictor variables is a controllable variable associated with any of the plurality of physical characteristics that is affected by any of the plurality of physical characteristics associated with any directly-controllable variable,
the control system comprising:
   a multivariate adaptive regression splines (MARS) modeler;
   a mixed integer linear programming (MILP) transformer; and
   an optimization engine,
wherein, during a predefined time horizon that includes multiple time intervals each followed by a control point:
   (a) the MARS modeler is configured to (i) construct a MARS prediction model using those of the predictor variables associated with the time interval that immediately precedes the respective control point, and (ii) use the MARS prediction model to define an optimization problem for the respective control point,
   (b) the MILP transformer is configured to transform the optimization problem into a mixed integer linear programming problem,
   (c) the optimization engine is configured to solve the MILP problem, to determine at least one optimized value for any given one of the directly-controllable variables, and
   (d) the control system is configured to adjust, using the at least one optimized value, the adjustable operational control setting corresponding to the given directly-controllable variable, to thereby control the physical characteristic associated with the directly-controllable variable during the time interval immediately following the respective control point.

7. The control system according to claim 6 wherein the MARS modeler is configured to construct the MARS prediction model using, as values for any of the predictor variables, real historical measurements of values of any of the plurality of physical characteristics of the physical system.

8. The control system according to claim 6 wherein the MARS modeler is configured to construct the MARS prediction model using, as values for any of the predictor variables, simulated historical measurement values of any of the plurality of physical characteristics of the physical system.

9. The control system according to claim 6 wherein one or more of the predictor variables is an uncontrollable variable associated with any of the plurality of physical characteristics that is unaffected by any of the plurality of physical characteristics that are associated with any directly-controllable variable.

10. The control system according to claim 6 wherein the predefined time horizon is a moving time horizon of a constant size.

11. A computer program product for controlling a physical system, wherein the physical system comprises:
   adjustable operational control settings, and
   a plurality of physical characteristics each associated with a predictor variable,
   wherein at least one of the predictor variables is a directly-controllable variable associated with one of the operational control settings and directly controls one of the plurality of physical characteristics that is associated with the respective directly-controllable variable,
   wherein at least one of the predictor variables is a controllable variable associated with any of the plurality of physical characteristics that is affected by any of the plurality of physical characteristics associated with any directly-controllable variable,
the computer program product comprising:
   a non-transitory, computer-readable storage medium; and
   computer-readable program code embodied in the storage medium, wherein the computer-readable program code is configured for, during a predefined time horizon that includes multiple time intervals each followed by a control point:
at each of the control points:
   (a) constructing a multivariate adaptive regression splines (MARS) prediction model using those of the predictor variables associated with the time interval that immediately precedes the respective control point,
   (b) using the MARS prediction model to define an optimization problem for the respective control point,
   (c) transforming the optimization problem into a mixed integer linear programming (MILP) problem,
   (d) solving the MILP problem using an optimization engine, to determine at least one optimized value for any given one of the directly-controllable variables, and
   (e) adjusting, using the at least one optimized value, the adjustable operational control setting corresponding to the given directly-controllable variable, to thereby control the physical characteristic associated with the directly-controllable variable during the time interval immediately following the respective control point.

12. The computer program product according to claim 11 wherein one or more of the predictor variables is an uncontrollable variable associated with any of the plurality of physical characteristics that is unaffected by any of the plurality of physical characteristics that are associated with any directly-controllable variable.

* * * * *